Aug. 25, 1931.   R. FOULKS   1,820,017
REMOVABLE BEARING MOUNTING
Filed July 27, 1929
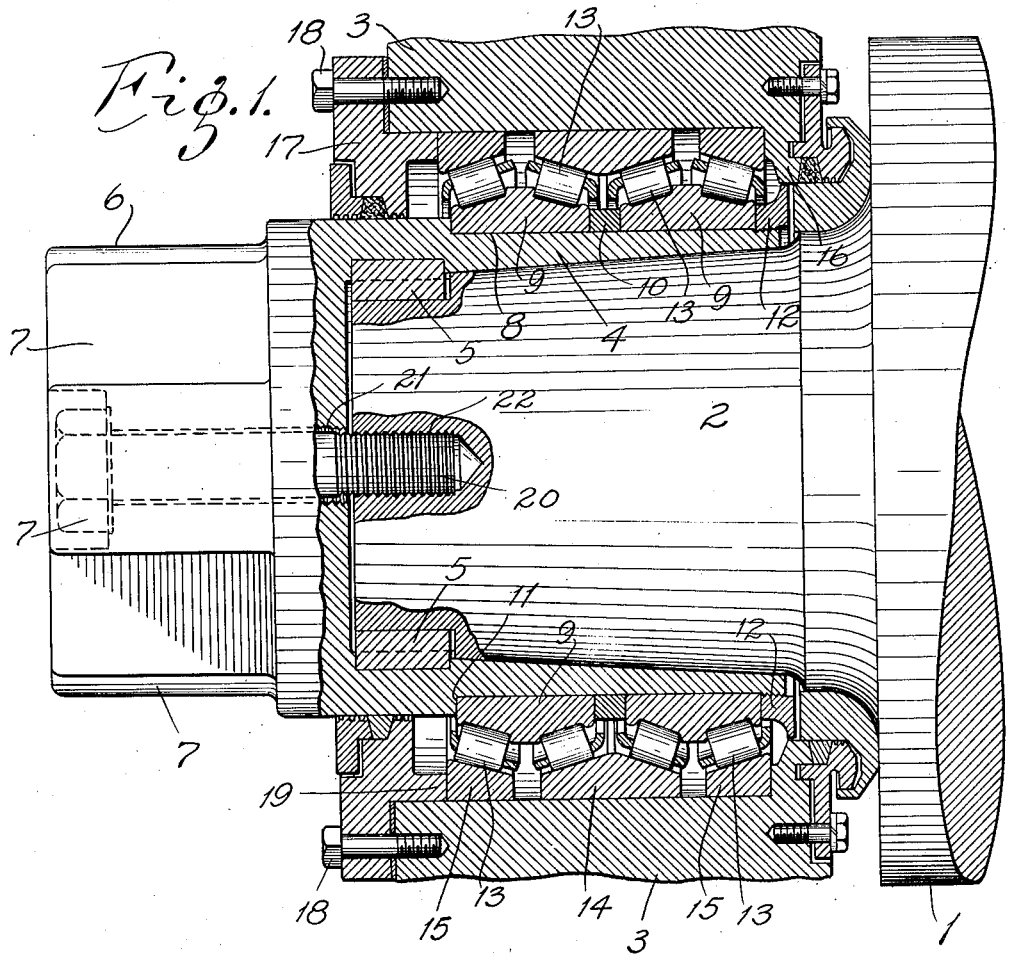
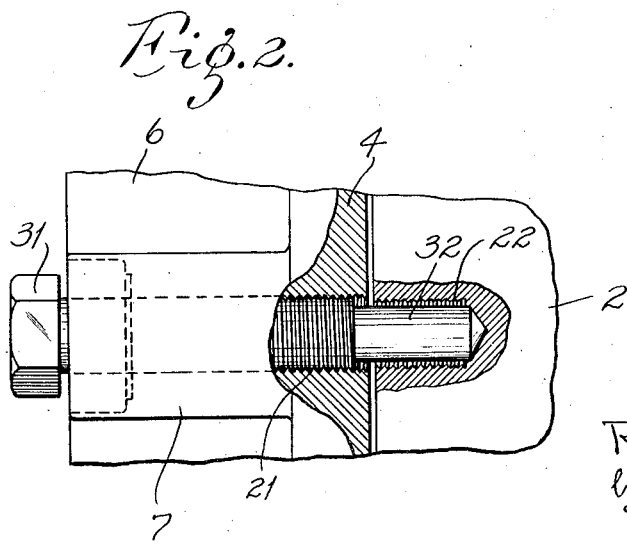
INVENTOR:
Robert Foulks,
by Carr & Carr & Gravely,
HIS ATTORNEYS.

Patented Aug. 25, 1931

1,820,017

UNITED STATES PATENT OFFICE

ROBERT FOULKS, OF CANTON, OHIO, ASSIGNOR TO THE TIMKEN ROLLER BEARING COMPANY, OF CANTON, OHIO, A CORPORATION OF OHIO

REMOVABLE BEARING MOUNTING

Application filed July 27, 1929. Serial No. 381,654.

My invention relates to removable bearing mountings, particularly to such constructions as antifrictionally mounted rolls of rolling mills, in which it is necessary to remove the bearings from the rolls to permit interchange of rolls. The invention consists principally in an internally conical sleeve member adapted to be mounted on the conical end portion of a rolling mill roll and carrying an antifriction bearing or bearings. The invention further consists in the removable bearing mounting and in the combinations and arrangements of parts hereinafter described and claimed.

In the accompanying drawings,

Fig. 1 is a longitudinal sectional view of a portion of a rolling mill frame and roll end or neck provided with a removable bearing mounting embodying my invention, and Fig. 2 is a detail view showing means for removing the bearing mounting from the roll.

As is well known, it is necessary to remove the rolls of rolling mills rather frequently, due to wear of the rolls and to the necessity of substituting different rolls when the character of the work rolled by the mill is changed. This necessity for removing rolls has greatly interfered with the use of antifriction bearings in rolling mills: If the bearings are mounted tight on the reduced or neck portion of the mill rolls, removal of such rolls is quite difficult and frequently results in damage to the roll or bearing or both; on the other hand, if the bearing is loosely mounted on the roll to facilitate removal of the bearing from the roll, the inner race member of the bearing creeps on the roll, thus scoring the roll and the race member and also resulting in improper bearing adjustment. In the case of the multiple series antifriction bearings commonly used, removal of the bearings individually results in loss of the adjustment of all of the parts thereof and when the parts of the bearing are reassembled on another roll, it is quite difficult to obtain correct bearing adjustment. The present invention eliminates all of the foregoing difficulties by permitting removal of a multiple series bearing without destroying the bearing adjustment, by making it easy to remove the bearings from the rolls and at the same time maintaining proper bearing adjustment during the rolling and by preventing creeping of the bearings on the rolls.

The drawings disclose a mill roll 1 having a reduced tapering end portion 2 that extends into the roll frame 3. Mounted on said tapering end portion 2 of the roll is an internally conical sleeve 4 that is secured against rotation on the roll 1 as by keys 5 or splines and that has an end portion 6 formed with wabbler teeth 7 to cooperate with the usual wabbler drive member (not shown in the drawings. It will be understood that according to common practice, the mill roll has a portion integral therewith that is made similar to the projecting end portion 6 of the present sleeve to cooperate with a wabbler drive member.)

The sleeve 4 has a cylindrical portion 8 of reduced diameter forming a seat for the cones 9 or inner race members of antifriction bearings. The drawings illustrate two doubly conical inner race members 9, spaced apart the proper distance by a spacer sleeve 10 (and by shims if required). The outermost cone 9 is seated against a shoulder 11 formed at the end of the cylindrical bearing seat 8 and the innermost cone is engaged by a ring 12 threaded onto the end of said sleeve 4. Two series of taper rollers 13 are mounted on each bearing cone 9. A doubly conical cup 14 or outer bearing member is mounted in the frame 3 to cooperate with the two middle series of bearing rollers and single cups 15 for the two endmost series of bearing rollers are likewise mounted in the frame. At the inner side of the frame 3 (adjacent to the mill roll 1) is an integral rib 16 forming a seat for one of said bearing cups 15 and at the outer side of the frame (away from the mill roll) is a ring 17 that is positioned by screws 18 and has an annular rib 19 abutting against the outermost bearing cup.

When the outer closure ring member 17 is removed (and the wabbler drive member also removed) the sleeve 4 may be removed from the roll end, carrying with it all parts of the bearing except the innermost bearing cup 15, which remains seated in the mill frame 3. The roll 1 may then be removed from the mill and a different roll inserted, whereupon the sleeve and bearings may easily be mounted thereon.

In order to hold the sleeve 4 on the roll and secure proper bearing adjustment, a threaded bolt 20 is provided which extends through an enlarged bore 21 in the end of the sleeve 4 and is threaded into a threaded hole 22 in the roll end. By turning this bolt the sleeve 4 may be moved along the roll 1 to secure it properly thereon.

The enlarged sleeve bore 21 is threaded; and to remove the sleeve 4 from the roll 1, a bolt 31 is provided having a reduced end portion 32 extending to the bottom of the hole 22 in the end of the roll and having a threaded body portion fitting in the threads of said sleeve bore 21. By turning this bolt 31, the reaction of the end of the bolt against the roll 1 causes the sleeve to be stripped from the roll.

The above described construction greatly facilitates the work of removing the bearings from mill rolls and still permits the proper mounting of bearings, since the bearing cones may be pressed on the sleeve.

Scoring of the rolls is prevented and proper adjustment of the bearings is maintained even when they are removed from the roll.

Obviously numerous changes may be made without departing from the invention; and I do not wish to be limited to the precise construction shown.

What I claim is:

A removable bearing mounting for rolling mill rolls having a conical end portion extending into a frame member, comprising an internally conical sleeve fitting on said conical end portion and antifriction bearings on said sleeve, said sleeve having a threaded bore therethrough and the end of said roll having a threaded recess of smaller diameter than said sleeve bore, whereby said sleeve may be secured on said roll end by means of a bolt small enough to clear the threads of said sleeve bore and having a threaded end portion fitting the thread of the recess in said roll, and may be removed from said roll by the use of a bolt having a threaded body portion and an end portion small enough to clear the threads of the recess in said roll.

Signed at Canton, Ohio, this 17 day of July 1929.

ROBERT FOULKS.